United States Patent
Prasad et al.

(10) Patent No.: US 8,126,885 B2
(45) Date of Patent: Feb. 28, 2012

(54) HISTORY BASED SEARCH SERVICE OPERABLE WITH MULTIPLE APPLICATIONS AND SERVICES

(75) Inventors: Srikiran Prasad, Santa Clara, CA (US); Matias G. Duarte, Sunnyvale, CA (US); Jeremy G. Lyon, Sunnyvale, CA (US); Michelle Koh, Marina Del Rey, CA (US); Daniel Marc G. Shiplacoff, Los Angeles, CA (US); Yunmei Wei, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 229 days.

(21) Appl. No.: 12/404,869

(22) Filed: Mar. 16, 2009

(65) Prior Publication Data
US 2010/0161594 A1    Jun. 24, 2010

Related U.S. Application Data
(60) Provisional application No. 61/139,337, filed on Dec. 19, 2008.

(51) Int. Cl.
*G06F 7/00* (2006.01)
*G06F 17/30* (2006.01)
*G06F 3/048* (2006.01)
*G06F 3/14* (2006.01)

(52) U.S. Cl. ........ 707/727; 707/732; 707/912; 715/791; 715/864

(58) Field of Classification Search .................. 707/707, 707/727, 751, 732–734, 912; 715/808, 864, 715/791
See application file for complete search history.

(56) References Cited

U.S. PATENT DOCUMENTS

| | | | |
|---|---|---|---|
| 7,209,915 B1 * | 4/2007 | Taboada et al. | 707/755 |
| 7,827,170 B1 * | 11/2010 | Horling et al. | 707/722 |
| 2005/0022130 A1 * | 1/2005 | Fabritius | 715/739 |
| 2005/0149496 A1 * | 7/2005 | Mukherjee et al. | 707/3 |
| 2005/0165777 A1 * | 7/2005 | Hurst-Hiller et al. | 707/4 |
| 2006/0206460 A1 | 9/2006 | Gadkari | |
| 2007/0005573 A1 * | 1/2007 | Murarka et al. | 707/3 |
| 2007/0130153 A1 * | 6/2007 | Nachman et al. | 707/10 |
| 2007/0288457 A1 * | 12/2007 | Aravamudan et al. | 707/5 |
| 2008/0059460 A1 | 3/2008 | Lunenfeld | |
| 2008/0177994 A1 * | 7/2008 | Mayer | 713/2 |
| 2008/0208812 A1 * | 8/2008 | Quoc et al. | 707/3 |

OTHER PUBLICATIONS

PCT International Search Report and Written Opinion, PCT Application No. PCT/US2009/067504, Jul. 2, 2010, 9 pages.

* cited by examiner

*Primary Examiner* — Kimberly Lovel
*Assistant Examiner* — James E Richardson

(57) ABSTRACT

A method, a device and a computer readable storage medium for enhancing user experience associated with searching data associated with one or more applications/services accessible on a mobile computing device. The result of the search is selected organized based on previous history of user actions to present the most relevant data entries to the user. Options associated with the searched data entries are also selected and organized based on previous history of user actions to facilitate performing of the user's intended functions on the mobile computing device. Further, searched data entries may be presented to the user in an argument oriented presentation mode where the searched data entries represent arguments for functions or a function oriented presentation mode where the searched data entries represent functions to be performed on the mobile computing device.

14 Claims, 10 Drawing Sheets

HISTORY BASED SEARCH SERVICE OPERABLE WITH MULTIPLE APPLICATIONS AND SERVICES

CROSS-REFERENCE TO RELATED APPLICATIONS

This application claims priority under 35 U.S.C. §119(e) to co-pending U.S. Provisional Patent Application No. 61/139,337 entitled "History Based Search Service Operable with Multiple Applications and Services" filed on Dec. 19, 2008, which is incorporated by reference herein in its entirety.

BACKGROUND

1. Field of Art

The disclosure generally relates to the field of searching data entries from applications or services on a mobile computing device, more specifically, to organizing searched results from the applications or services for presentation to a user.

2. Description of the Related Art

Mobile computing devices such as smartphones or personal digital assistants (PDAs) are continuously evolving into a more complex device with increasing computational and storage capacity. As the capacity of the mobile computing device increases, users are storing increasing amount of data on the mobile computing device, executing an increasing number of applications on the mobile computing device, and accessing an increasing number of services on the mobile computing device. The increased amount of data stored in conjunction with the increased number of applications and services are making it increasingly difficult for the users to retrieve the information the users want. The users must often navigate through a series of menus and screens associated with different applications or services to find and retrieve the data user wants.

Many applications or services have built-in search mechanisms to search data entries associated with the applications or services. In order to access these search mechanisms, the corresponding applications or services are first launched. The user then provides search conditions to the applications or services. The applications or services perform searches on their data entries and return the search results for presentation to the user. The users may then select the searched data entries to perform further functions.

Some search applications perform searches across various types of data entries associate with different applications or services. Such search applications interoperate with services or applications associated with the data entries to present search conditions to the services or applications, query the data entries using the built-in search mechanisms, and collect the search results from the services or applications for presentation to the users. Other search applications generate and maintain their own indexes of the data entries. When a query is received, such search applications run queries on its indexes and present the results to the users.

SUMMARY

Embodiments disclose a method, a computer readable storage medium and a mobile computing device for searching and presenting searched data entries associated with applications or services. The searched data entries matching a search condition are organized by a processing configuration based on history data representing user actions taken responsive to being presented with search results for previous searches. The data entries that are most likely being searched by a user are selected and prioritized for presentation to the user.

In one embodiment, options associated with the matching data entries are also presented to the user for selection. The options may be presented to the user in a screen view separate from a screen view displaying the matched data entries. Alternatively, the options may be presented on the same screen view that displays the matched data entries. By selecting one of the options, the user may seamlessly and conveniently perform a function on the mobile computing device based on the searched data entries. The options to be presented to the user may also be selected and be organized based on the history data.

In one embodiment, each matching data entry represents a function that can be performed on the mobile computing device. Each option associated with the matching data entries represent an argument associated with the function.

In one embodiment, each matching data entry represents an argument of functions available on the mobile computing device. Each option associated with the matching data entry represents available functions that can be performed on the matching data entries.

In one embodiment, one or more applications or services to be searched are selected by applying rules on received user inputs. The rules may determine the applications or services to be searched based on the number of characters in the search condition.

In one embodiment, a search window for receiving the search condition is overlaid on one or more windows associated with the applications or services. The search window may be transparent or semi-transparent to allow the user to continue viewing the information displayed on the windows of the applications or services.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying drawings, in which:

FIG. (FIG.) 1 is a schematic diagram illustrating the architecture of mobile computing device environment for performing searches, according to one embodiment.

DETAILED DESCRIPTION

Figure 1:
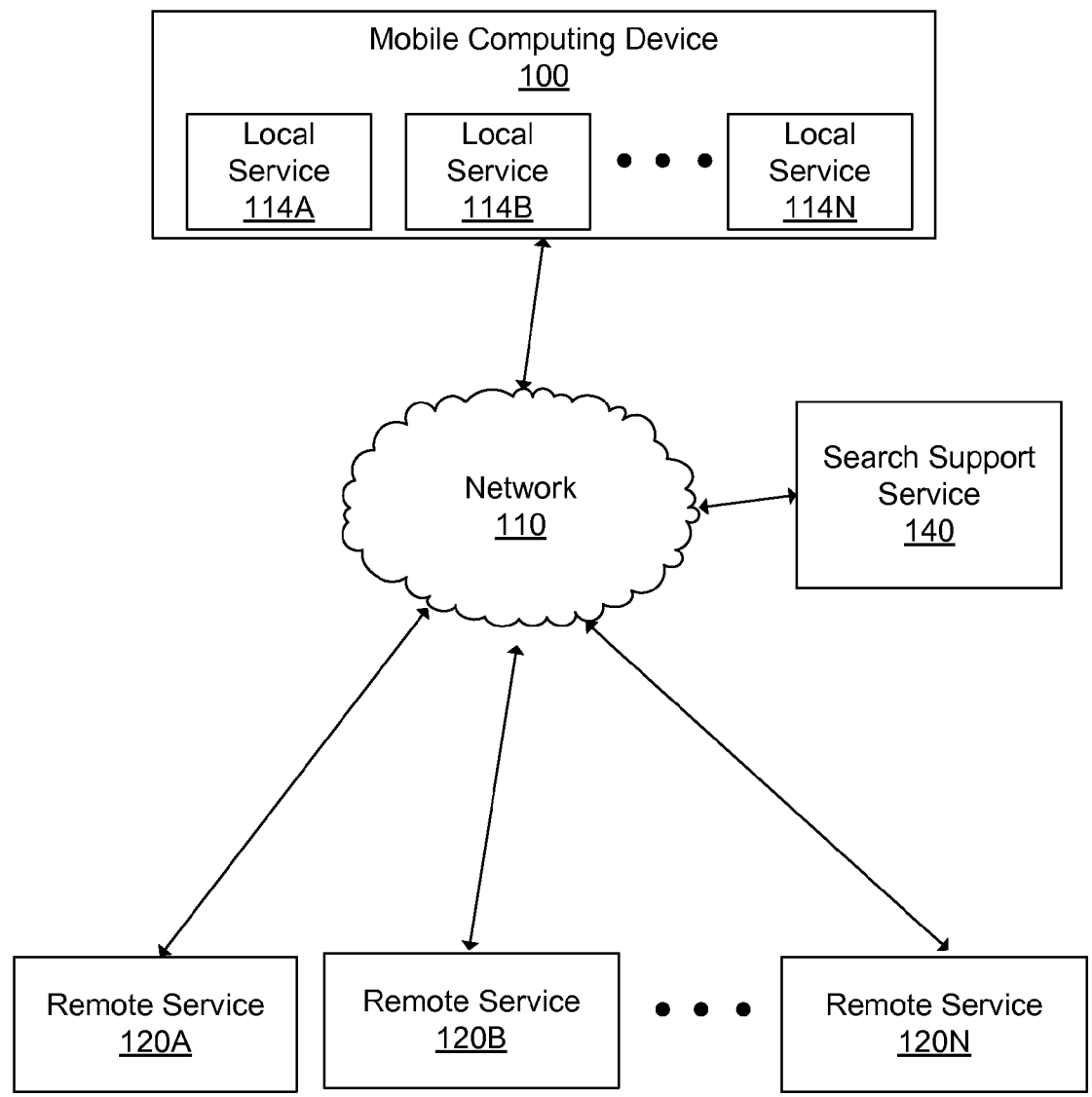

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles disclosed herein.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Embodiments disclosed include a method, a device and a computer readable storage medium for enhancing user experience associated with searching data associated with one or more applications/services accessible on a mobile computing device. The result of the search is organized based on previous history of user actions to present the most relevant data entries to the user. Options associated with the searched data entries are also organized based on the previous history of user action to facilitate performing of the user's intended functions on the mobile computing device. Further, searched data entries may be presented to the user in an argument oriented presentation mode where the searched data entries represent arguments for functions or a function oriented presentation mode where the searched data entries represent functions to be performed on the mobile computing device.

A mobile computing device is any portable computing device that can be carried around by a user. The mobile computing device includes, among others, an MP3 player, a mobile phone, a smart phone, a PDA (Personal Digital Assistant), and a video game console.

A search condition includes any conditions provided to limit the number of matching data entries. The search condition includes search terms that indicate one or more characters to be included in the data entries. The search condition also includes, among others, the size of the data entries, the time at which the data entry was generated or modified, and the location where the data entries are stored.

Applications are computer programs that interact with users to allow the users to perform desired tasks on the mobile computing devices. The application programs include, among others, web browsers, media players, and phone operation managers. Two or more applications may operate in conjunction to perform a desired task on the mobile computing device.

Services are a group of data and functions accessible by applications. The services are often managed independent of the applications. The service provide various useful data and perform various functions in conjunction with the applications. The services may be implemented locally on the mobile computing device or remotely in a computing device separate from the mobile computing device. The services include, among others, web mapping services, traffic information service, contact management service, and email services. Functions conventionally provided by applications may be moved to services where the applications provide basic user interfaces while the service performs bulk of the functions. For example, an application may perform basic functions of receiving user inputs and generating screen views while a contact information service interfacing with the application searches contacts, and manages the contacts.

A data entry is a piece of information associated with an application or a service. The data entry includes, among others, a file, an entry in a database, and a string of characters in a menu or parameter setting of an application or a service. Each data entry may be associated with one or more applications or services.

User actions indicate any actions taken by a user. The user actions are expressed in terms of user inputs provided to the mobile computing device.

Architecture for Performing Searches on Mobile Computing Device

FIG. 1 is a schematic diagram illustrating the network architecture of the mobile computing device environment, according to one embodiment. The mobile computing device 100 accesses one or more remote services 120A through 120N (hereinafter, collectively referred to as "the remote services 120") and a search support service 140 via a network 110. The network 110 may be implemented using any conventional methods using wireless and wired communications. The mobile computing device 100 also loads and executes local services 114A through 114N (hereinafter, collectively referred to as "the local services 114").

The network architecture as illustrated in FIG. 1 is advantageous compared to a stand-alone mobile computing device where all services are implemented on the mobile computing device because various components or functions implemented on the mobile computing device 100 can be ported to other computing devices coupled to the network 110. Instead of using its own resources to perform the functions, the mobile computing device 100 communicates with other computing device over the network 110 to perform the functions related to searches on the other computing devices. In this way, the mobile computing device 100 may be made light and compact because less software and hardware components may be loaded and executed on the mobile computing device 100.

The local services 114 or remote services 120 are accessed via applications executed on the mobile computing device 100 to perform functions requested by the users. Both the local services 114 and the remote services 120 are accessed by application programs, as described below in detail with reference to FIG. 3. The local services 114 such as contact information services rely solely on data stored on the mobile computing device 100 to provide services. In contrast, remote services 120 such as a web mapping service (e.g., Google Maps) require access to network (e.g., Internet) and external computing devices to provide its services. A local service may be converted to a remote service by porting data associated with the service from the mobile computing device 100 to an external computing device coupled to the network 110 as well known in the art. Likewise, a remote service may be converted to a local service by porting executable code and related data from the external computing device to the mobile computing device 100 as well known in the art.

The search support service 140 provides support associated with search operation performed on the mobile computing device 100, as described below in detail with reference to FIG. 4B. The search support service 140 may be viewed as a special type of remote service that functions to provide search related services to the mobile computing device 100 over the network 110. The search support service 140 may be implemented as a component of the mobile computing device 100. Alternatively, the data in the search support service 140 may be cached on the mobile computing device 100 so that the mobile computing device 100 can perform search operation when network access is not available.

Embodiments are described herein mostly with reference to the network architecture of FIG. 1. The principles disclosed herein, however, are not limited to the network architecture and can also be applied to stand-alone mobile computing devices where search operations are performed only locally by the mobile computing device 100. It is not essential that the mobile computing device 100 be capable of accessing the network 110. The mobile computing device 100 may be a stand-alone device that is incapable of accessing any network. Such stand-alone mobile computing device may access only the local services 114 but not any remote services 120. Also, the search support service 140 may be incorporated as a component of the mobile computing device 100.

Architecture of Example Mobile Computing Device

Figure 2:
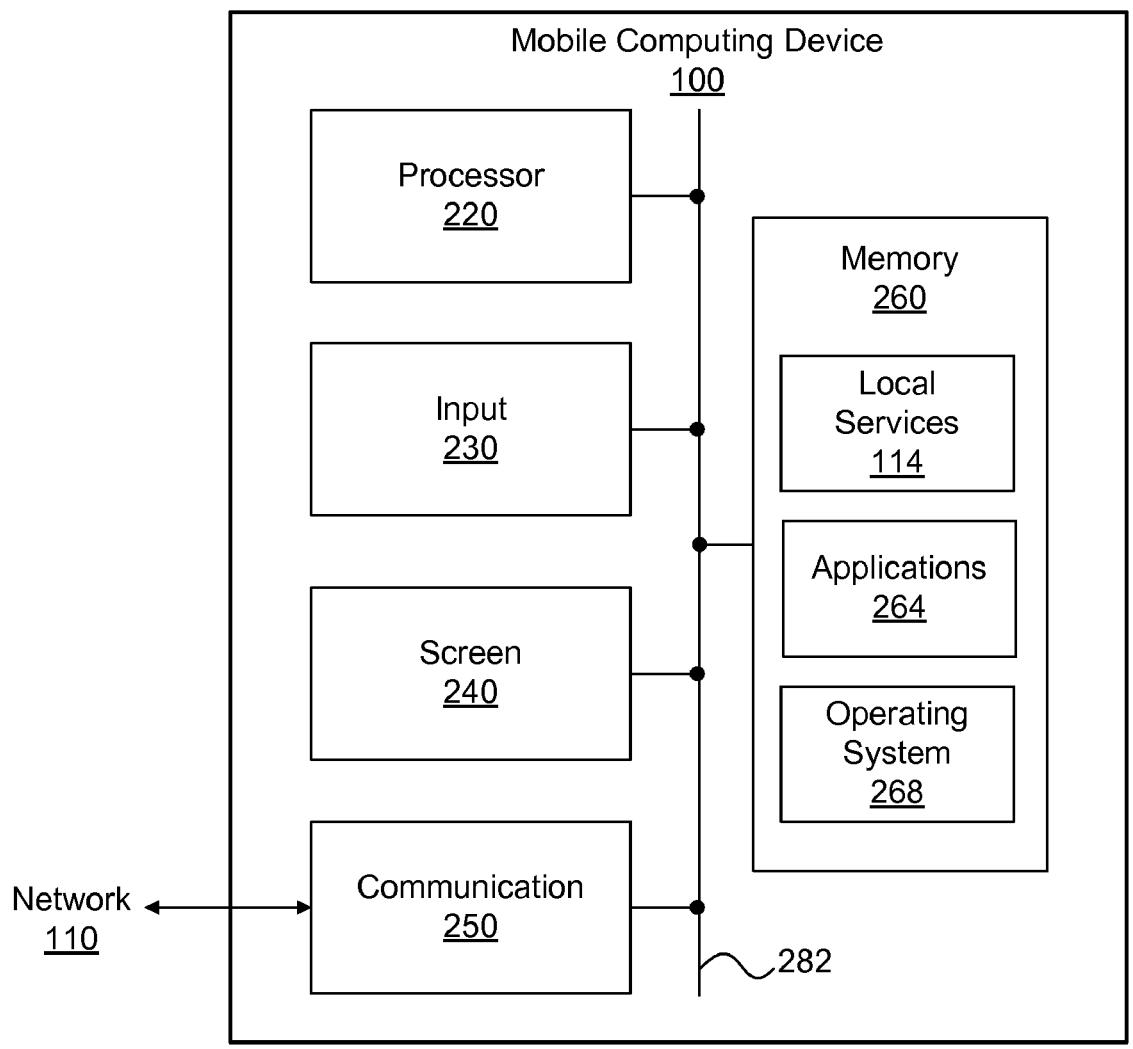
FIG. 2 is a block diagram illustrating a mobile computing device according to one embodiment.

FIG. 2 illustrates one embodiment of the mobile computing device 100 with network functionality. The mobile computing device 100 may access the network 110 to place or receive telephone calls as well as exchange other types of data. For ease of understanding and explanation, the following embodiments are described below using a mobile computing device 100 with telephonic functionality as an example. The principles disclosed herein, however, may be applied in other types of mobile computing devices.

The mobile computing device 100 includes, among others, a processor 220, an input device 230, a screen 240, a communication module 250, and a memory 260. The components of the mobile computing device 100 communicate via a bus 282. The processor 220 executes instructions stored in the memory 260 to perform various types of operation on the mobile computing device 100. Although FIG. 2 illustrates only one processor 220, multiple processors may be used in the mobile computing device 100.

The input device 230 receives various user inputs and detects user actions on the mobile computing device 100. The input device 230 may include, among others, one or more switches, sliders, motion sensors, and a touch screen.

The screen 240 of the mobile computing device 100 may be implemented using various display technology such as liquid crystal display (LCD), organic light-emitting diode (OLED), light-emitting diode display (LED), electroluminescent displays (ELDs), bistable liquid crystal displays, cholesteric displays, and filed emission displays (FEDs). The screen 240 displays various screen views associated with applications or services as well as windows associated with search operation.

The communication module 250 communicates with the network 110 via conventional wired or wireless protocols including, among others, Bluetooth, Wireless Fidelity (WiFi), General Packet Radio Service (GPRS), third-generation (3G) mobile, High Speed Download Packet Access (HSDPA), High Speed Uplink Packet Access (HSUPA), and Worldwide Interoperability for Microwave Access (WiMAX). In one embodiment, two or more distinct communication modules may be provided to communicate with the same or different network via multiple protocols. For example, the mobile computing device 100 may include a Bluetooth communication module for short range-communication and a 3G communication module for long-range communication.

The memory 260 may be implemented as any conventional data memory including, among others, various types of volatile or non-volatile memory. Two or more types of memory may also be used in conjunction. Further, removable memory such as memory stick may also be used.

The memory 260 includes software components including among others, local services 114, applications 264, and an operating system 268. The local services 114 are accessed by one or more applications 264 to provide various services to the user. In one embodiment, one or more local services 114 include or are associated with a database for storing data entries. The interoperation between the local services 114 and the applications 264 is described below in detail with reference to FIG. 3. The operating system 268 manages and coordinates resources accessed by the applications 264.

Example Search Operation Mechanism

Figure 3:
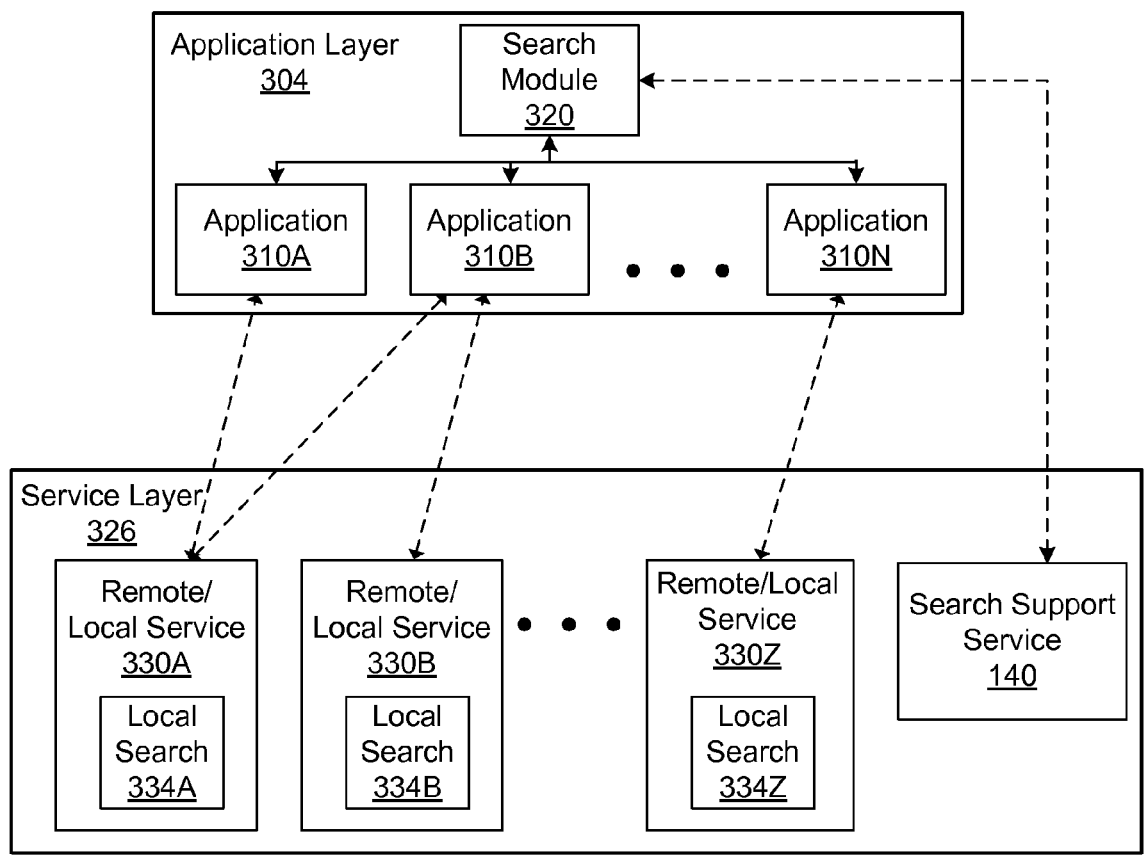
FIG. 3 is a conceptual diagram illustrating interoperation between an application layer and a service layer, according to one embodiment.

FIG. 3 is a conceptual diagram illustrating interoperation between applications and services, according to one embodiment. An application layer 304 includes applications 310A through 310N (hereinafter, collectively referred to as "the applications 310") and a search module 320. The applications allow users to access various remote/local services 330A through 330Z (hereinafter, collectively referred to as "the remote/local services 330"). The applications 310 include, among others, a web browser. The search module 320 is a special type of application dedicated to performing searches on data associated with the remote/local services 330, as described below in detail with reference to FIG. 4A.

The remote/local services 330 provide various data and functions to the user via the applications 310. In one embodiment, local services share the same database to store data entries. The remote services run on a computing device separate form the mobile computing device 100. The data associated with the remote services are communicated via the network 110, as described above in detail with reference to FIG. 1.

The remote/local service 330 includes local search engines 334A through 334Z (hereinafter, collectively referred to as "local search engines 334"). Each local search engine 334A through 334Z is dedicated to performing search on data entries associated with its remote/local service 330A through 330Z. During search operation, one or more applications 310 receive a search request from a search module 320. The search request is then forwarded to one or more local search engines 334. The local search engines 334 search the data entries of its remote/local services 330 and return the search result to the applications 310 and/or the search module 320.

The applications 310 may also include search engines that perform searches on their data entries or the data entries of the remote/local services 330. After performing search operation, the search engines returns the search results to the search module 320.

The search module 320 operates in conjunction with the search support service 140 to organize and select the search result for presentation to the user. The search results from the remote/local services 330 may include a very large number of hits matching the search condition. The search module 320 reduces the number of hits and prioritizes the hits based on previous history of searches and user actions taken after the searches. The search module 320 may also select applications or services to perform the search based on a policy including a set of heuristic rules for interpreting user inputs, as described below in detail with reference to FIG. 4B. As described above with reference to FIG. 1, the search support service 140 may be incorporated into the search module 320. Further, the functions of the search support service 140 may be selectively incorporated into the search module 320.

Figure 4A:
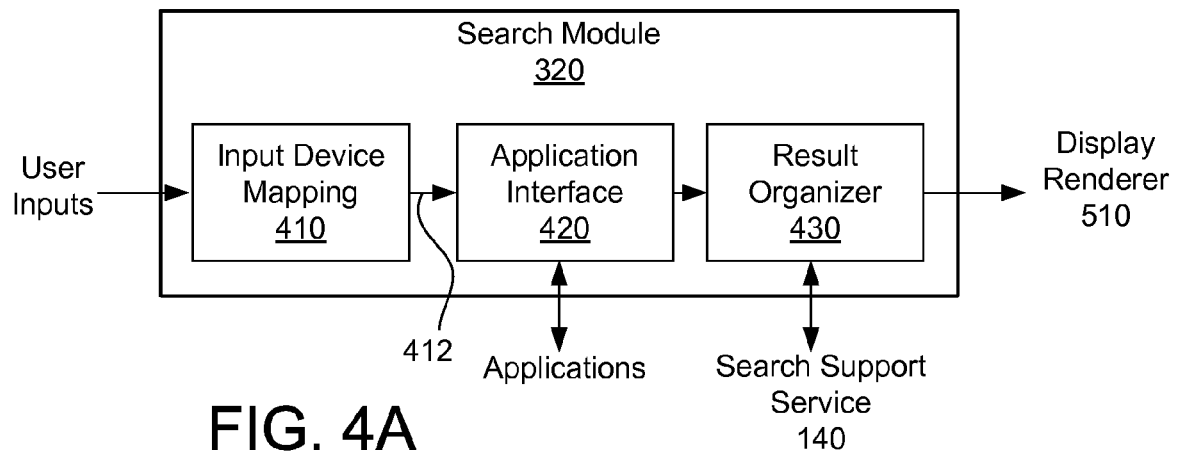
FIG. 4A is a block diagram illustrating a search module according to one embodiment.

FIG. 4A is a block diagram illustrating the search module 320 according to one embodiment. The search module 320 includes, among other components, an input device mapping module 410, an application interface 420, and a result organizer 430. One or more components of the search module 320 may be implemented in software, firmware, hardware, or any combinations thereof. Here, and elsewhere as disclosed herein, the software and/or firmware is embodied as instructions may be stored on a computer readable storage medium and are executable by a processor, e.g., the processor 220.

The input device mapping module 410 determines search arguments corresponding to user inputs received via the input device 230. Most mobile computing devices are not equipped with a full keyboard because of the limited space. Instead, a single key or switch is often used to represent more than one alphanumeric character or symbol. For example, a single key representing number "1" in a number mode may also represent an alphabet letter "e" in an alphabet mode. Also, a key representing a letter may also invoke a certain function (e.g., place a call to a certain person). Such mapping of keys and characters or functions is hardware dependent. That is, a key in a keypad may represent number "1" and a letter "e" in one mobile computing device but a similar key may represent number "1" and an asterisk ("*") in another mobile computing device. The input mapping module 410 stores the configuration of the input device 230 and translates received user inputs into a string of alphanumeric characters or symbols that constitute a search condition.

The input mapping module 410 may provide more than one possible sets of alphanumeric characters or symbols to the application interface 420 for searching. For example, a set of user inputs for the keypad in a numeric mode may represent a set of numbers "62" while the same user inputs in a letter mode may represent a set of letters "ma." The input mapping module 410 provides both the set of numbers and the set of letters as search terms 412 to the application interface 420. The input mapping module 410 may also function in conjunction with the policy database 460 to select only a plausible set of numbers or set of letters. For example, if the user inputs do not form a plausible word, the input mapping module 410 may determine that the user inputs indicate a set of numbers and present only the set of numbers to the application interface 420 for searching.

In one embodiment, the application interface 420 analyzes the user inputs as translated by the input device mapping 410 and determines the remote/local services 330 to be searched based on the heuristic rules as stored in the policy database 460, described below in detail with reference to FIG. 4B. The application interface 420 also interfaces with the applications 310 or the services 330 to provide the search condition as interpreted by the input device mapping module 410. The application interface 420 also receives the results of the search performed on the remote/local services via the applications 310.

The result organizer 430 functions in conjunction with the search support service 140 to select and organize the search results returned from the applications 310. The search results may include a large number of hits most of which are irrelevant to the user. The result organizer 430 implements an algorithm or a processing configuration for selecting and prioritizing the searched data entries so that the data entries most relevant to the user are presented in an organized manner on the screen 240, as described below in detail with reference to FIGS. 9A, 9B, 10, 11 and 12.

In one embodiment, the search results represent arguments associated with applications or services. The result organizer 430 may group such data entries according to applications or services associated with the data entries for presentation to the user, for example, as described below in detail with reference to FIG. 9A. In another embodiment, the data entries represent functions that can be performed on the mobile computing device 100. The data entries are displayed with arguments used frequently in connection with the function, for example, as described below in detail with reference to FIG. 10.

Figure 4B:
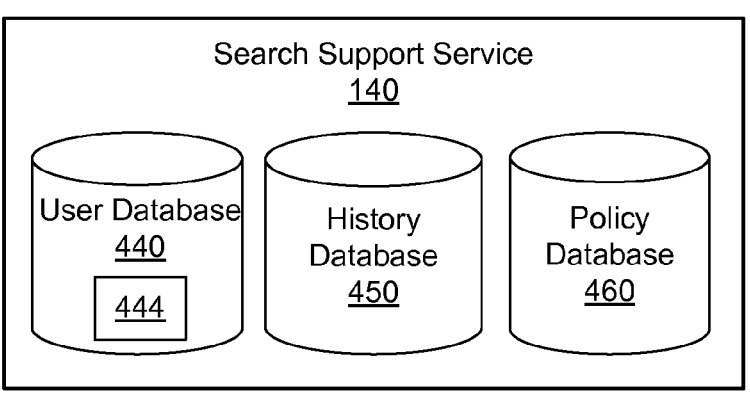
FIG. 4B is a block diagram illustrating a search support service according to one embodiment.

FIG. 4B is a block diagram illustrating the search support service 140 according to one embodiment. The search support service 140 performs various functions to support the search operation performed by the search module 320. The search support service 140 includes, among other components, a user database 440, a history database 450, and a policy database 460. One or more of these components may be embodied in hardware, software, firmware or combinations thereof.

The user database 440 stores information about users or their mobile computing devices registered for accessing the search support service 140. The user database 440 may include authentication information (e.g., password and login information) to allow only registered users or mobile computing devices to access the services provided by the search support service 140.

In one embodiment, the user database 440 stores device information 444 related to various configurations of the users' mobile computing device 100. The device information 444 includes, among others, information about the applications installed on the mobile computing device 100 and information about services accessible by the mobile computing device 100. The information about applications and the information about services include any setting parameters or menus of the applications or services. When conducting a global search, the search module 320 may search the device information 440 and present setting parameters or menus of applications or services as the searched data entries, as described below in detail with reference to FIG. 12.

The history database 450 stores, among others, previous history of user actions following search operation. In one embodiment, the history database 450 maintains separate history data for each user or mobile computing device. The history data may be set to default values for users initially. After the user provides the search condition and takes user actions based on the search result, the history data is updated. As the number of searches and subsequent user actions accumulate, the result organizer 430 may better predict which user actions are likely to ensue after being presented with the search result. Based on the history data in the history database 450, the result organizer 430 of the search module 320 selects and organizes hits in the search results in a manner that allows users to promptly and conveniently choose user actions. For example, an option associated with a user action that was taken most frequently in previous searches is displayed at the top of possible user actions that can be taken with respect to the searched data entries.

The policy database 460 stores heuristic rules for interpreting user inputs. The heuristic rules may be formulated by analyzing patterns of user actions. One example rule may determine the remote/local services 330 to be searched based on the number of characters in the search term. If a search term includes only one alphanumeric character, the rule dictates that the character corresponds to the first alphabet in the names of the applications or remote/local services. When a search term includes two or more characters, the rule dictates that the search term correspond to specific data entries in the remote/local services 330. Another example rule may interpret the user inputs as a phone number if the received user inputs do not form any plausible word.

The search support service 140 is configured to collect user actions in multiple mobile computing devices 100 used by different users and analyze the collected user actions to generate default history data to be used in a newly or recently activated mobile computing device 100.

In one embodiment, the history data and/or the policy data is cached in the search module 320. In this way, the search module 320 may perform search operation on the local services 114 when access to the network 110 is unavailable. Alternatively, the search module 320 may perform search operation based only on the cached information and periodically send the accumulated information about user actions performed on the mobile computing device 100 for processing at the search support service 140. The search support service 140 analyzes the information about user actions and sends the updated history data to the search module 320 for storage. The search support service 140 may also send updated policy data to the mobile computing device 100 periodically to the search module 320.

Figure 5:
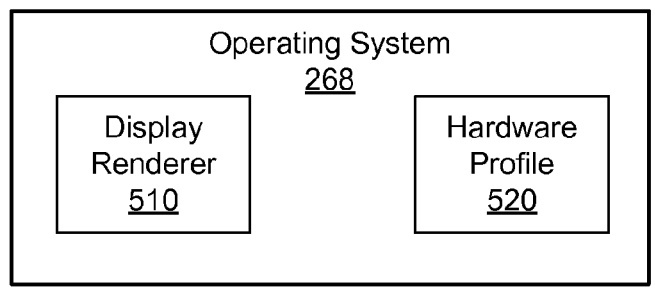
FIG. 5 is a block diagram illustrating an operating system, for example, in the mobile computing device of FIG. 2, according to one embodiment.

FIG. 5 is a block diagram illustrating the operating system 268 in the mobile computing device 100, according to one embodiment. The operating system 268 includes, among other components, a display renderer 510 and a hardware profile 520. The display render 510 operates in conjunction with applications 310 and the search module 320 to generate and display views on the screen 240.

The hardware profile 520 stores, among others, information about the user input devices 230. The input device mapping module 410 of the search module 320 may reference the hardware profile 520 to map the user inputs to alphanumeric characters or symbols.

Example Method of Performing Search

Figure 6:
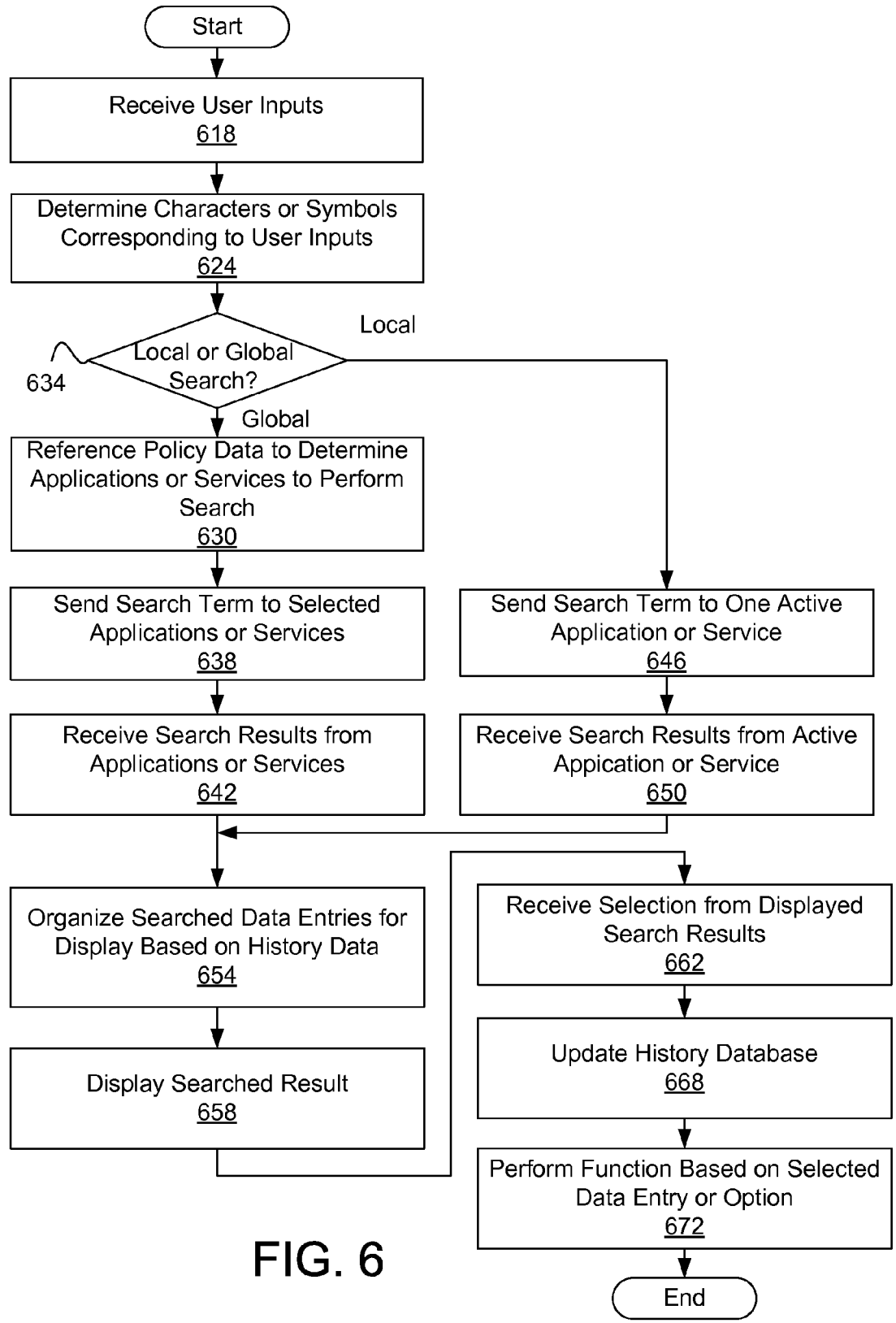
FIG. 6 is a flow chart illustrating a method of performing a search, for example, on the mobile computing device of FIG. 2, according to one embodiment.

FIG. 6 is a flow chart illustrating a method of performing search operation on the mobile computing device 100, according to one embodiment. The user inputs are received 618 at the mobile computing device 100 via the input device 230. As described above with reference to FIG. 4A, the input device mapping module 410 determines 624 one or more characters or symbols corresponding to the user inputs. In one embodiment, the input mapping module 410 operates in conjunction with the policy database 460 to determine the likely combinations of letters or numbers corresponding to the user inputs.

It is then determined 634 whether a local search or a global search is to be performed on the mobile computing device 100. In the local search mode, searches are performed only on one active application or service. In the global search mode, searches are performed on two or more applications or services. In one embodiment, a local search is performed when an active application or service (i.e., foreground application or service) is selected and running on the mobile computing device 100 whereas a global search is performed when the user is navigating through menus or windows without selecting an active application or service. In another embodiment, the user may select whether to perform a local search or a global search by providing a user input.

If it is determined that a global search is to be performed, the search module 320 selects the applications or services to be searched. In one embodiment, the search module 320 operates in conjunction with the policy database 460 to determine 630 which applications or services are to be searched. For example, if user inputs do not correspond to any plausible words and are likely to be a series of numbers, the search module 320 based on the rules in the policy database 460 determines that the search should be presented to a contact information service for organizing contact information and a weather service for providing zip-code based weather information but not to other services or applications. In one embodiment, the policy database 460 stores a list of words that can be recognized as plausible words.

After selecting the applications or services to be searched, the search module 320 sends search terms corresponding to the user inputs to selected applications or services 330. The selected services perform the searches and return the search results. The search module 320 receives 642 the search results. The result organizer 430 of the search module 320 then organizes 654 the searched data entries based on the history data stored in the history database 450. Specifically, the result organizer 430 selects the data entries that were most often selected after performing searches while removing the data entries that were infrequently selected or not selected in previous searches.

In one embodiment, the result organizer 430 determines the data entry most likely to be selected by the user after being presented with the search results. The data entry most likely to be selected is prioritized and then provided at the top of the hit list presented to the user. The search result as selected and organized by the result organizer 430 is displayed 658 on the screen 240 of the mobile computing device 100.

A user input selecting one of the data entries or an option associated with a data entry is received 662 via the input device 230. The history data stored in the history database 450 is updated 668 according to the selected data entry. The mobile computing device 100 then performs the function based on the selected data entry or the option associated with the data entry. Thereafter, the process may end or continue on with a related function.

If a local search is to be performed, the search module 320 sends 646 the search term corresponding to the user inputs to an active application or service. The active application or service performs the search and the returns the search result to the search module 320. The search module 320 receives 650 the search result from the active service. The process then proceeds to organize 654 the searched data entries. The subsequent steps are identical to the case where the global search is performed.

The process described above with reference to FIG. 6 is merely illustrative and various modifications can be made. For example, determining 624 characters or symbols corresponding to the user inputs may be omitted. The mobile computing device 100 may require the user to indicate the mode of the input device 230 (e.g., numeric key mode, and letter mode) and process only one combination of characters or symbols matching the indicated mode as the search term. The sequence of process may also be changed. For example, the history database may be updated 668 after performing 672 the function based on the selected data entry.

Performing Functions on Mobile Computing Device Based on Search Result

Searching on the mobile computing device 100 is performed mostly to perform further functions based on the result of the search. Therefore, it is advantageous to provide a way to seamlessly perform desired functions based on the search result. When a user must take user actions after being presented with the search results to perform a subsequent function, it would be convenient if options associated with the user actions are presented to the user in an intuitive and organized manner. At least the following two distinct modes of presenting the search results and receiving options may be adopted for such purpose: (i) an argument oriented presentation mode, and (ii) a function oriented presentation mode.

In the argument oriented presentation mode (also referred to as a "noun-verb mode"), the searched data entries represent arguments of functions that can be performed on the mobile computing device 100. The user is first presented with the arguments matching the search condition. The user can then select an argument and an option representing a function that can be performed on the selected data entry. For example, in response to user inputs corresponding to the search term "ma," the mobile computing device 100 returns data entries (e.g., names) including letters "m" and "a" such as "Matias Duarte" or "Mike Abbott" from the contact information service. These data entries are arguments of one or more functions that the user may perform on the mobile computing device 100. The user may then select a function (e.g., place call) to be performed on the selected name. An example screen view in the argument oriented presentation mode is described below in detail with reference to FIG. 9A.

In the function oriented presentation mode (also referred to as a "verb-noun mode"), the searched data entries represent functions that can be performed on the mobile computing device 100. The user is first presented with the functions matching the search term. The user can then select a function and an option representing an argument needed to perform the selected function. For example, a user may provide a search term "ma." The mobile computing device 100 returns functions including letters "m" and "a" such as "send email." The user then selects an argument such as the name of the recipient of the email to send an email to the recipient. An example screen view in the function oriented presentation mode is described below in detail with reference to FIG. 10.

The argument oriented presentation mode and function oriented presentation mode may be used together. That is, some searched data entries may represent arguments of functions while other searched data entries may represent the functions. Further, a mechanism may be provided that allows the user to toggle between the argument oriented presentation mode and the function oriented presentation mode.

In one embodiment, the searched data entries and options are presented in a manner so that a user automatically selects a data entry by selecting an option. For example, option boxes applicable to a data entry may be presented alongside or below the data entry. By selecting an option box beside or below the searched data entry, the user selects the option together with the data entry, for example, as described below in detail with reference to FIG. 11. In one embodiment, options available to the data entry are displayed only when one data entry (e.g., Matias Duarte) remains in a category (e.g., contacts).

The history data in the history database 450 may also be referenced to select and prioritize options available to the user in addition to selecting and prioritizing the searched data entries. The user is provided with numerous options for matching data entries that represent either arguments or functions. Taking the example where the matching data entries include the function of sending emails, the options associated with sending an email may include hundreds of email addresses stored in a contact information service. Displaying all the email addresses as options associated with the function of sending emails would take up excessive amount of space and overwhelm the user. Therefore, the history data in the database 450 may be used to select and prioritize the options associated with the searched data entries. For example, the mobile computing device 100 may select and present two or three options that the user most frequently selected for the associated function based on the history data. The number of options to be presented and the manner of presentation may be set manually or be modified based on the number of searched data entries and/or the number of options associated with the searched data entries.

Example Screen Views on Mobile Computing Device

Figure 7A:
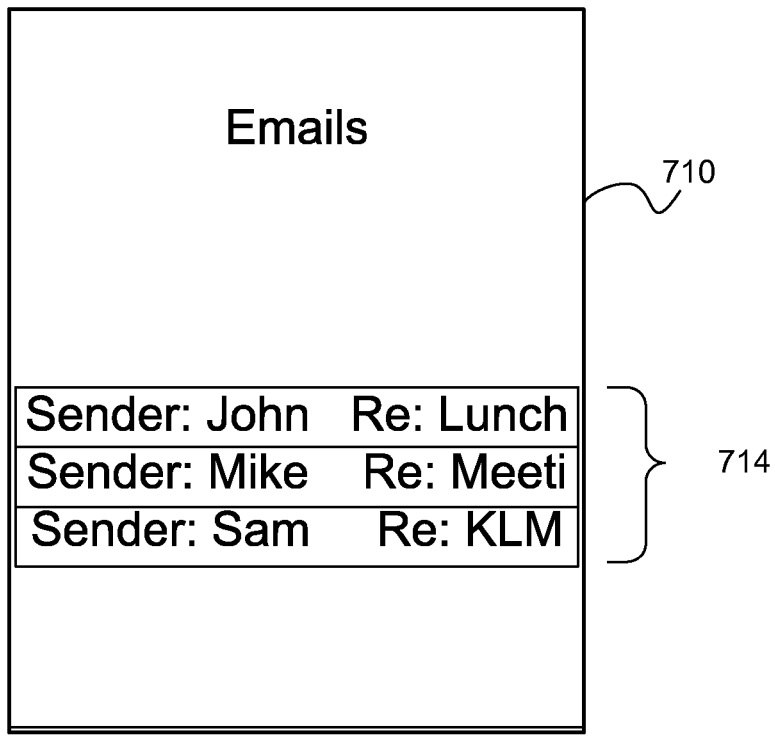
FIG. 7A is a screen view displaying an email service accessed on a mobile computing device, according to one embodiment.

FIG. 7A is an example screen view 710 of an email service accessed on a mobile computing device 100, according to one embodiment. In FIG. 7A, the email service is currently active and running on the computing device. A window associated with the email service occupies most of the screen 240. Received emails are displayed in area 714 of the screen view 710.

Figure 7B:
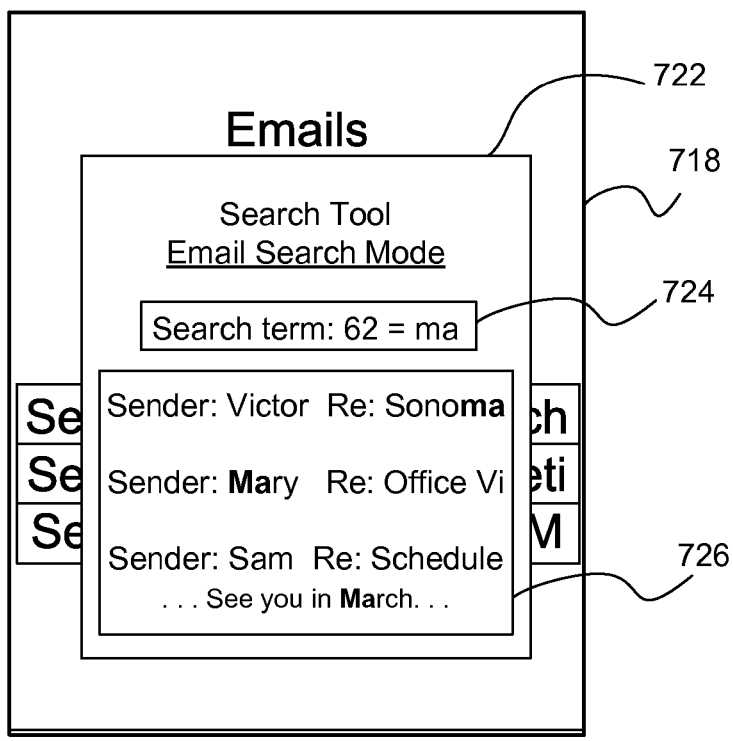
FIG. 7B is a screen view displaying a search application window launched while an email service is active, according to one embodiment.

FIG. 7B is an example screen view 718 showing a search tool window 722 launched while the email service is active. The search tool window 722 is generated by the search module 320 operating in conjunction with the display renderer 510 of the operating system 268. In the example of FIG. 7B, the search module 320 is in a local search mode operating to search only the data entries associated with the email service. The user has provided user inputs corresponding to numbers "62" in the numeric mode or letters "m" and "a" in the letter mode via the input device 230, as illustrated in box 724. The search results are provided in box 726. In one embodiment, the search tool window 722 and its contents are transparent or semi-transparent so that the user can continue to read the information of the email service despite launching of the search tool window 722.

Figure 7C:
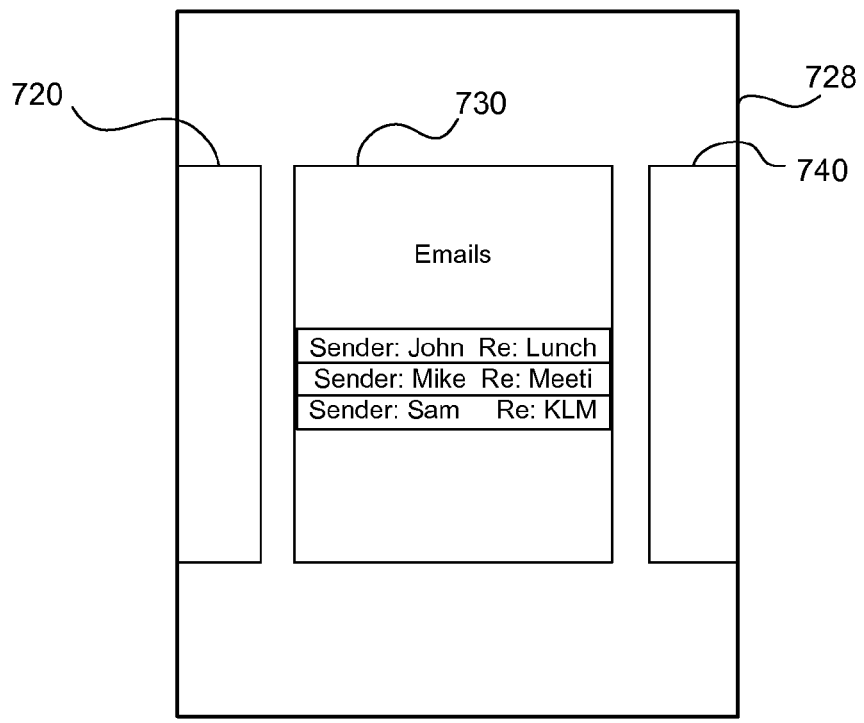
FIG. 7C is a screen view illustrating the window of the email service of FIG. 7A zoomed out and displayed along with windows of other applications or services, according to one embodiment.

FIG. 7C is an example screen view 728 illustrating a zoomed out view for navigating among different applications or services, according to one embodiment. The window 730 of the email service is displayed in conjunction with windows 720, 740 of other applications or services. The user may flick a touch screen or other input devices to navigate the screen view 728 and select an application or service that the user wants to access.

Figure 8:
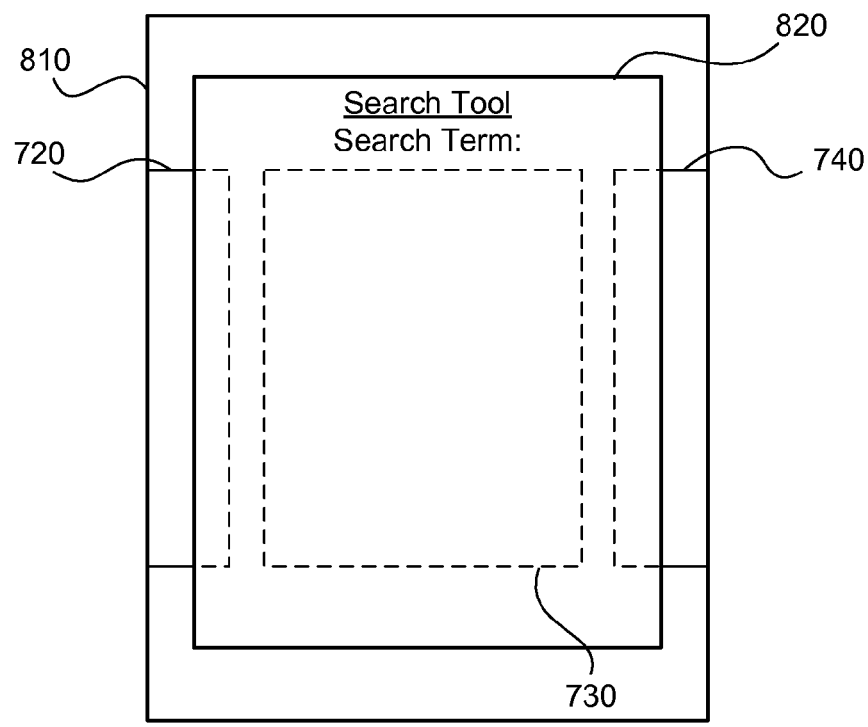
FIG. 8 is a screen view illustrating the window of a search application overlaid on zoomed-out windows of FIG. 7C, according to one embodiment.

FIG. 8 is an example screen view 810 illustrating a search tool window 820 launched on a zoomed-out view of FIG. 7C. The search module 320 generating the search tool window 820 is in a global search mode where data entries associated with multiple applications or services are searched. In one embodiment, the search tool window 820 is transparent or semi-transparent to allow the user to continue viewing the information displayed on windows 720, 730 and 740. Presenting a transparent or semi-transparent search tool window 820 is advantageous, among other reasons, because the user may continue to track changes in windows 720 through 740, and need not memorize the information displayed on the windows 720 through 740 that may be needed for the search operation.

Figure 9A:
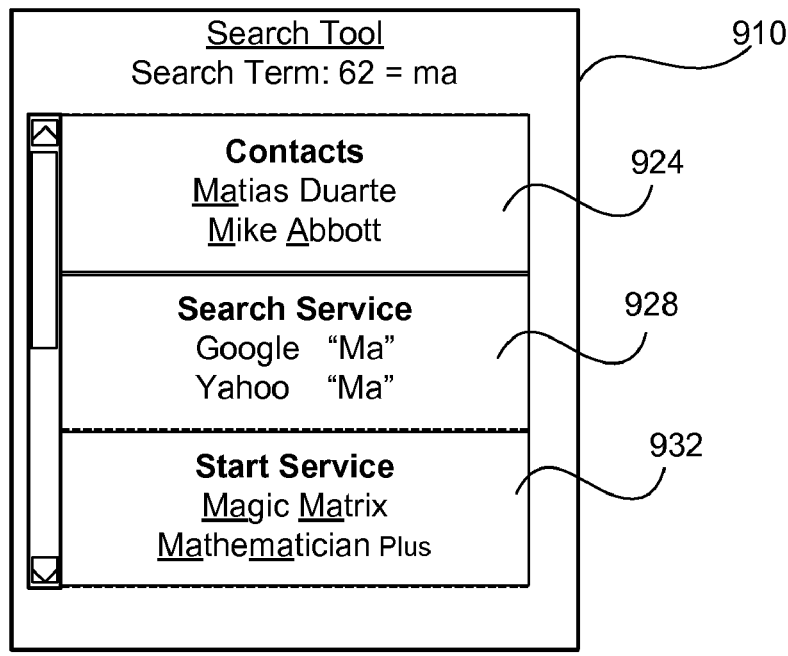
FIG. 9A is a screen view illustrating a search result organized in an argument oriented presentation mode, according to one embodiment.

FIG. 9A is an example search result displayed on a search tool window 910 for a search conducted for a search term "62" or "ma" in the argument oriented presentation mode, according to one embodiment. The search tool window 910 displays the searched data entries (i.e., "Matias Duarte," "Mike Abbott," "Google," "Yahoo," "Magic Matrix," and "Mathematician Plus") indicating arguments for functions that the user may choose to perform next. The searched data entries are grouped into at least three categories by the result organizer 430: (i) contacts, (ii) search service, and (iii) launch application. When the user selects a searched data entry from box 924, the user is presented with options to choose a function associated with the data entry, for example, as described below in detail with reference to FIG. 9B. When the user selects an entry from box 928, the search term of "ma" is presented to one of the Internet search engines. When the user selects a data entry from box 932, an application or service corresponding to the selected data entry is launched on the mobile computing device 100.

Figure 9B:
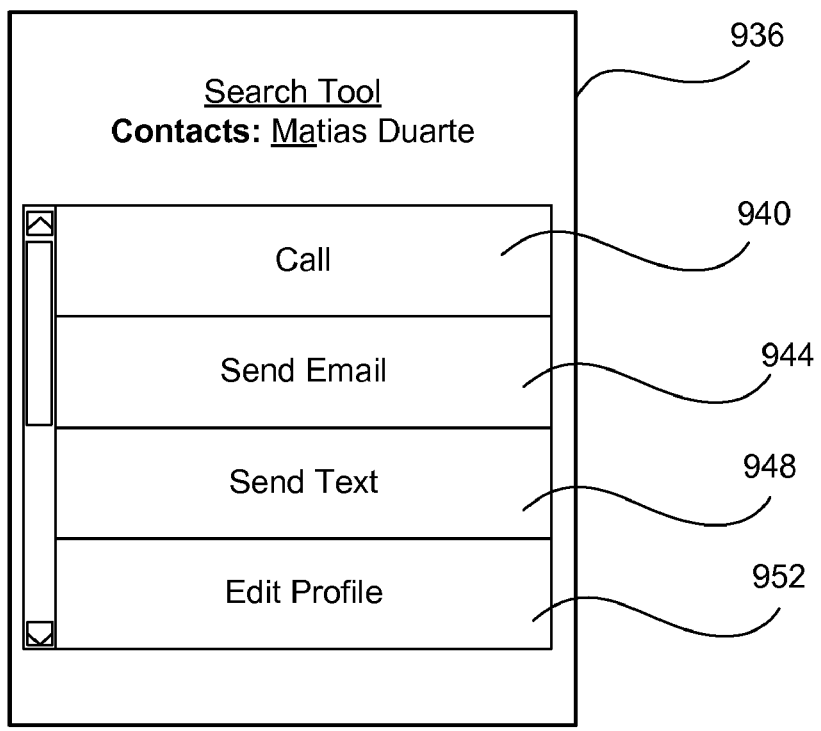
FIG. 9B is a screen view illustrating options available for a searched data entry of FIG. 9A, according to one embodiment.

FIG. 9B is an example screen view 936 after selecting the data entry of "Matias Duarte" from the screen view 910 of FIG. 9A. The screen view 936 displays four functions (i.e., call, send an email, send a text message, and edit the profile of "Matias Duarte") that can be performed on the argument of "Matias Duarte." By selecting one of the boxes 940 through 952, the user can cause the mobile computing device 100 to perform the corresponding function. As described above, the functions to be presented on the screen view 936 may be selected and prioritized based on the history data in the history database 450.

Figure 10:
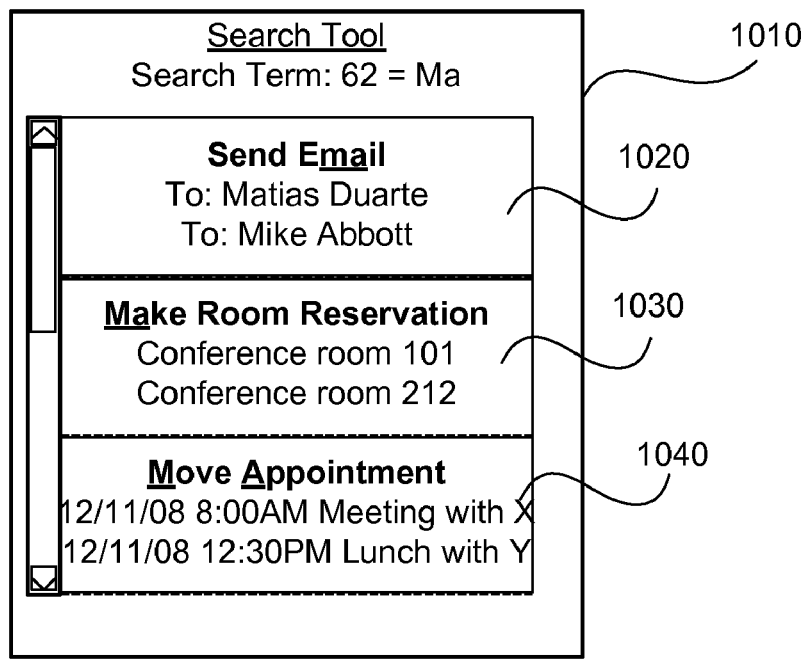
FIG. 10 is a screen view illustrating a search result organized in a function oriented presentation mode, according to one embodiment.

FIG. 10 is an example search result displayed on a search tool window 1010 for a search conducted for a search term "62" or "ma" based on a function oriented search, according to one embodiment. The search tool window 1010 includes three boxes 1020, 1030, 1040 indicating functions available on the mobile computing device 100. The box 1020 indicates the data entry of "send email," and two options associated with that function ("Matias Duarte" and "Mike Abbott"). The two persons ("Matias Duarte" and "Mike Abbott") were the two most frequently selected arguments after performing searches in previous occasions. When one of the two recipients is selected, a window associated with email service is launched in which the recipient field of the email is automatically filled with the selected recipient.

The box 1030 indicates the data entry of "make room reservation." Although there may be more than two rooms where the reservation may be made, the result organizer 430 selects the two most frequently reserved room as options associated with a room reservation service. The user may select either "conference room 101" or "conference room 212" to launch a fillable form associated with the room reservation service. The "place" field of the fillable form may be automatically filled with the conference room 101 or the conference room 212 depending on the selection of the user.

The box 1040 indicates the data entry for "move appointment" function. In the example of FIG. 9A, the two mostly recently updated appointments are displayed as options associated with the function of moving the appointment.

Figure 11:
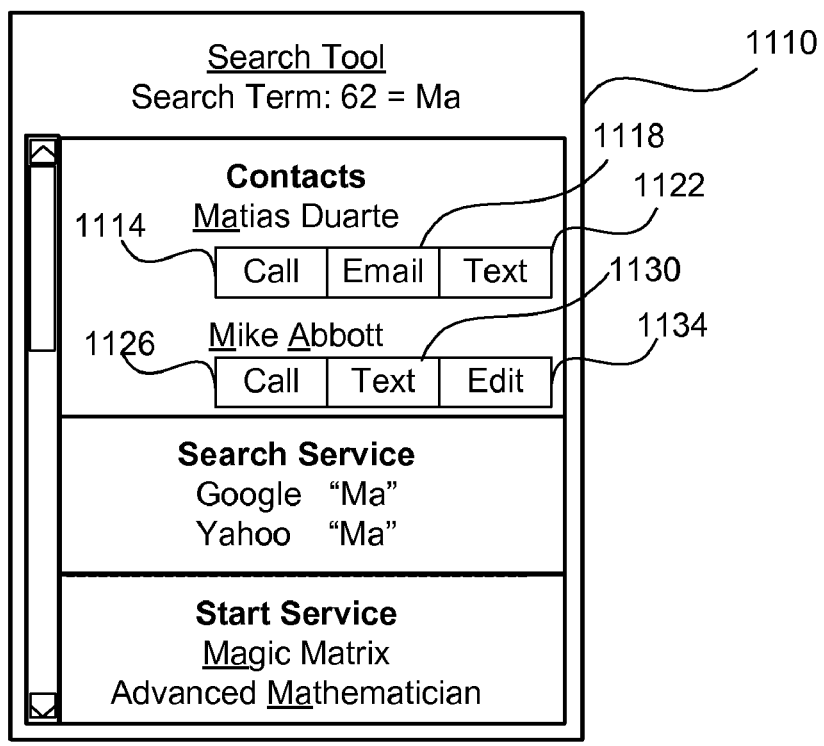
FIG. 11 is a screen view illustrating a search result together with options for searched data entries in the search result, according to one embodiment.

FIG. 11 is an example screen view 1110 displaying the searched data entries and functions that can be performed on the searched data entries on the same screen view, according to one embodiment. The screen view 1110 of FIG. 11 is essentially the same as the screen view 910 of FIG. 9A except that functions available for searched data entries are displayed in boxes 1114 through 1134. If the box 1114 is selected, a phone call is placed on "Matias Duarte" based on his contact information stored in the contact information service. If the box 1118 is selected, a window for drafting an email to "Matias Duarte" is launched where the recipient field of the email is automatically filled with the email address for "Matias Duarte" as stored in the contact information service. Similarly, if box 1122 is selected, a window for drafting a SMS (Short Message Service) text message is launched where the recipient is automatically identified as the phone number of "Matias Duarte" as stored in the contact information service.

For the searched data entry of "Mike Abbott," email contact information is not available from the contact information service. Therefore, a box indicating the function of sending email is not displayed. Instead, the functions of calling, sending a SMS text message, and editing the contact information of "Mike Abbott" are presented as options in boxes 1126, 1130 and 1134, respectively.

Presenting options associated with the searched data entries and the searched data entries on the same screen view as described above with reference to FIG. 11 is advantageous, among other reasons, because the user need not proceed to another screen view to select an option associated with the searched data entries, and thereby reduces the number of user inputs and time needed to identify the user's intended operation on the mobile computing device 100.

Figure 12:
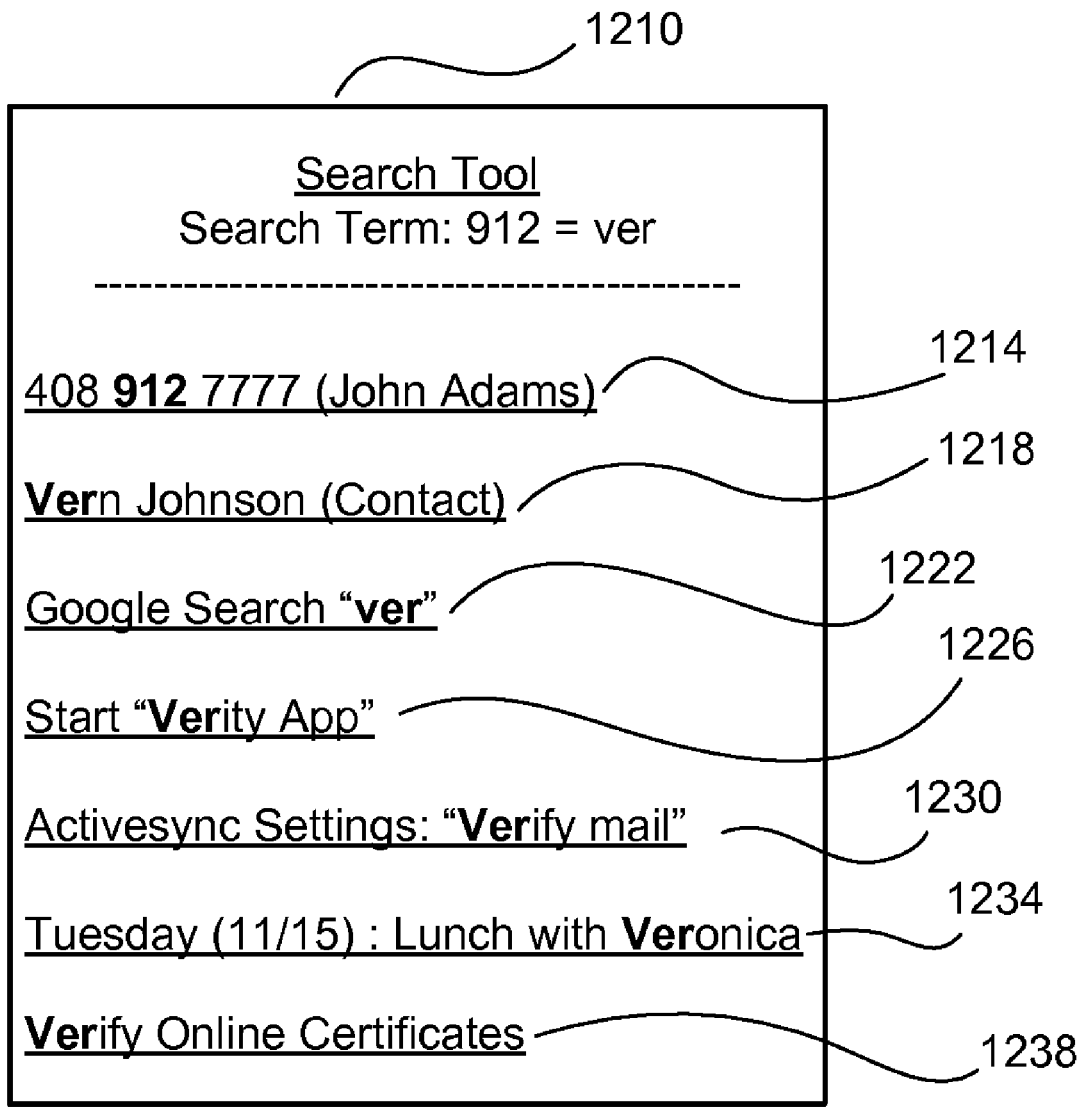
FIG. 12 is a screen view illustrating a search result including data entries in a function oriented presentation mode and an argument oriented presentation mode, according to one embodiment.

FIG. 12 is an example screen view 1210 displaying various types of searched data entries, according to one embodiment. In FIG. 12, the user inputs received correspond to a number "912" in a numeric mode, and a string of letters "ver" in a letter mode. The returned search result, therefore, includes data entries including either the number "912" or letters "ver." A first data entry 1214 is a phone number including the number "912" that the user recently selected after performing a search on the mobile computing device 100. Data entry 1218 is contact information for a person named "Vern Johnson." The user can select the second data entry 1218 to choose a function to be performed on "Vern Johnson." Data entry 1222 is a data entry for searching word "ver" in Google search engine.

Data entry 1230 is associated with an entry in a menu of an application (i.e., Activesync). During a global search, the data entries to be searched may include various setting parameters and menu items of applications or services. To search such settings and services, the search module 320 retrieves the device information 444 from the search support service 140. Alternatively, the device information may be stored on the mobile computing device 100 so that a search of menus and settings can be performed locally on the mobile computing device 100.

Data entry 1234 relates to an appointment in a schedule managing service. By selecting the data entry 1234, the user is presented with options representing functions that the user can perform with respect to the appointment.

Data entry 1238 relates to performing a function of "verifying online certificates." After selecting the data entry 1238, the user may be presented with options indicating the online certificates to be verified.

The data entries 1214 to 1234 are all in argument oriented presentation mode because the number "912" or the letter "ver" is associated with arguments of functions that can be performed on the mobile computing device 100. In contrast, the data entry 1238 is in a function oriented presentation mode because the function of "verifying" is displayed in the search result and the user then selects the certificate (i.e., argument) for that function. The screen view 1210 is an example where the search results are provided to the user in both the argument oriented presentation mode and the function oriented presentation mode.

Some portions of above description describe the embodiments in terms of algorithms and symbolic representations of operations on information, for example, as described with respect to FIGS. 3 and 6-12. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof. As previously noted, the software or firmware comprise instructions that may be stored in a computer readable storage medium (e.g., the memory 260), and executable by a processor (e.g., the processor 220).

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system, a method and a storage medium for performing searches and presenting search results to users through the disclosed principles herein. Thus, while particular embodiments and applications have been illustrated and described, it is to be understood that the present disclosure is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

The invention claimed is:

1. A computer-implemented method for searching and presenting searched data entries on a mobile computing device, the method being performed by one or more processors of the mobile computing device and comprising:
   generating a search condition responsive to receiving one or more user inputs;
   searching data entries associated with one or more applications or services to obtain one or more matching data entries satisfying the search condition, wherein searching data entries associated with one or more applications or services includes selecting data entries pertaining to one application or service or pertaining to a plurality of applications or services based, at least in part, on (i) a count of characters in the search condition, and (ii) a state of use of one or more applications or services at the time the search condition is generated;
   organizing the one or more matching data entries by a processing configuration based on history data representing user actions taken responsive to being presented with search results for previous searches;
   displaying the organized matching data entries on a screen of the mobile computing device; and
   in response to receiving a user input for selecting one of the organized matching data entries, (i) organizing options associated with the selected matching data entry based on the history data, and (ii) displaying the organized options on the screen of the mobile computing device.

2. The method of claim 1, wherein the one or more applications or services includes at least one of a communication application, a web browser, a calendar application, a media player, or a map application.

3. The method of claim 1, further comprising, in response to receiving a user input for selecting one of the organized options, automatically performing a function corresponding to the selected one of the organized options.

4. The method of claim 1, wherein organizing the one or more matching data entries comprises removing at least one matching data entry and prioritizing remaining matching data entries for display.

5. The method of claim 1, further comprising:
   displaying one or more windows associated with the one or more applications or services on the screen; and
   displaying a transparent or semi-transparent search window for receiving the search condition overlaid on the windows associated with the applications or services.

6. A non-transitory computer readable storage medium for storing instructions for searching and presenting searched data entries on a mobile computing device, the instructions when executed by a processor cause the processor to:
   generate a search condition responsive to receiving one or more user inputs;
   search data entries associated with one or more applications or services to obtain one or more matching data entries satisfying the search condition, wherein searching data entries associated with one or more applications or services includes selecting data entries pertaining to one application or service or pertaining to a plurality of applications or services based, at least in part, on (i) a count of characters in the search condition, and (ii) a state of use of one or more applications or services at the time the search condition is generated;

organize the one or more matching data entries by a processing configuration based on history data representing user actions taken responsive to being presented with search results for previous searches;

display the organized matching data entries on a screen of the mobile computing device; and in response to receiving a user input for selecting one of the organized matching data entries, (i) organize options associated with the selected matching data entry based on the history data, and (ii) display the organized options on the screen of the mobile computing device.

7. The computer readable storage medium of claim 6, wherein the one or more applications or services includes at least one of a communication application, a web browser, a calendar application, a media player, or a map application.

8. The computer readable storage medium of claim 7, further comprising instructions that cause the processor to, in response to receiving a user input for selecting one of the organized options, automatically perform a function corresponding to the selected one of the organized options.

9. The computer readable storage medium of claim 6, wherein the instructions to organize the one or more matching data entries comprises instructions to remove at least one matching data entry and prioritize remaining matching data entries for display.

10. The computer readable storage medium of claim 6, further comprising instructions that cause the processor to:

display one or more windows associated with the one or more applications or services on the screen; and display a transparent or semi-transparent search window for receiving the search condition overlaid on the windows associated with the applications or services.

11. A mobile computing device configured to search and present searched data entries, the mobile computing device comprising:

a display;
an input device;
a memory resource; and
one or more processors configured to:

generate a search condition responsive to receiving one or more user inputs on the input device;

search data entries associated with one or more applications or services to obtain one or more matching data entries satisfying the search condition, wherein searching data entries associated with one or more applications or services includes selecting data entries pertaining to one application or service or pertaining to a plurality of applications or services based, at least in part, on (i) a count of characters in the search condition, and (ii) a state of use of one or more applications or services at the time the search condition is generated;

organize the one or more matching data entries by a processing configuration based on history data representing user actions taken responsive to being presented with search results for previous searches;

display the organized data entries on the display; and in response to receiving a user input for selecting one of the organized matching data entries, (i) organize options associated with the selected matching data entry based on the history data, and (ii) display the organized options on the display of the mobile computing device.

12. The mobile computing device of claim 11, wherein the one or more processors is further configured to:

in response to receiving a user input for selecting one of the organized options, automatically perform a function corresponding to the selected one of the organized options.

13. The mobile computing device of claim 12, wherein the one or more applications or services includes at least one of a communication application, a web browser, a calendar application, a media player, or a map application.

14. The mobile computing device of claim 12, wherein organizing the one or more matching data entries comprises removing at least one matching data entry and prioritizing remaining matching data entries for display.

* * * * *